United States Patent
Yang et al.

(10) Patent No.: US 12,439,302 B2
(45) Date of Patent: Oct. 7, 2025

(54) CELL HANDOVER METHOD AND TERMINAL

(71) Applicant: VIVO MOBILE COMMUNICATION CO., LTD., Dongguan (CN)

(72) Inventors: Ang Yang, Dongguan (CN); Peng Sun, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 380 days.

(21) Appl. No.: 18/106,456

(22) Filed: Feb. 6, 2023

(65) Prior Publication Data
US 2023/0189099 A1    Jun. 15, 2023

Related U.S. Application Data

(63) Continuation of application No. PCT/CN2021/110500, filed on Aug. 4, 2021.

(30) Foreign Application Priority Data

Aug. 7, 2020 (CN) .......................... 202010790876.6

(51) Int. Cl.
- *H04W 36/00* (2009.01)
- *H04W 36/08* (2009.01)
- *H04W 36/24* (2009.01)
- *H04W 36/30* (2009.01)

(52) U.S. Cl.
CPC . *H04W 36/0069* (2018.08); *H04W 36/00837* (2018.08); *H04W 36/08* (2013.01); *H04W 36/249* (2023.05); *H04W 36/30* (2013.01)

(58) Field of Classification Search
CPC ....... H04W 36/0069; H04W 36/00837; H04W 36/08; H04W 36/249; H04W 36/30; H04W 36/0055; H04W 72/23
See application file for complete search history.

(56) References Cited

U.S. PATENT DOCUMENTS

| | | | |
|---|---|---|---|
| 11,258,502 B2 * | 2/2022 | You | H04L 5/0023 |
| 11,653,345 B2 * | 5/2023 | Yerramalli | H04B 17/318 370/329 |
| 11,751,113 B2 * | 9/2023 | Damnjanovic | H04W 36/10 370/331 |
| 12,120,571 B2 * | 10/2024 | Zhang | H04W 36/304 |

(Continued)

FOREIGN PATENT DOCUMENTS

| | | |
|---|---|---|
| CN | 111066292 A | 4/2020 |
| CN | 111372292 A | 7/2020 |

(Continued)

OTHER PUBLICATIONS

Extended European Search Report issued in related European Application No. 21852238.1, mailed Jan. 23, 2024, 11 pages.

(Continued)

*Primary Examiner* — Eunsook Choi
(74) *Attorney, Agent, or Firm* — IPX PLLC (57) ABSTRACT

A cell handover method and a terminal are provided. The method includes: determining, by a terminal according to a Downlink Control Information (DCI) indicator, whether a cell handover trigger condition is met; and the terminal performs a cell handover in a case that the cell handover trigger condition is met.

20 Claims, 3 Drawing Sheets

(56) References Cited

U.S. PATENT DOCUMENTS

| | | | |
|---|---|---|---|
| 12,126,560 B1* | 10/2024 | Kwak | H04W 74/0833 |
| 12,256,407 B2* | 3/2025 | Svedman | H04W 72/23 |
| 2012/0327904 A1 | 12/2012 | Park et al. | |
| 2018/0192347 A1 | 7/2018 | Shaheen | |
| 2019/0246378 A1 | 8/2019 | Islam et al. | |
| 2020/0045700 A1 | 2/2020 | Sun et al. | |
| 2020/0112886 A1 | 4/2020 | John Wilson et al. | |
| 2020/0204246 A1* | 6/2020 | Zhou | H04W 72/044 |
| 2021/0028979 A1* | 1/2021 | Takeda | H04W 72/23 |
| 2022/0303858 A1* | 9/2022 | Zhang | H04W 36/0064 |

FOREIGN PATENT DOCUMENTS

| | | |
|---|---|---|
| CN | 111372293 A | 7/2020 |
| WO | 2018028700 A1 | 2/2018 |

OTHER PUBLICATIONS

Qualcomm Incorporated: "On NTN Initial Search and Handover", 3GPP Draft; RI-1911117, Oct. 2019, 3 pages.

Notice of Reason of Refusal issued in related Japanese Application No. 2023-507893, mailed May 7, 2024, 3 pages.

International Search Report issued in corresponding International Application No. PCT/CN2021/110500, mailed Oct. 20, 2021, 5 pages.

Huawei et al, "Considerations on Mobility Management in NTN", 3GPP TSG-RAN WG2 Meeting #104 R2-1818248, Nov. 2018, 4 pages.

First Office Action issued in related Chinese Application No. 202010790876.6, mailed Oct. 18, 2022, 5 pages.

\* cited by examiner

CELL HANDOVER METHOD AND TERMINAL

CROSS-REFERENCE TO RELATED APPLICATIONS

This application is a continuation of International Application No. PCT/CN2021/110500, filed on Aug. 4, 2021, which claims priority to Chinese Patent Application No. 202010790876.6, filed on Aug. 7, 2020, The entire contents of each of the above-identified applications are expressly incorporated herein by reference.

TECHNICAL HELD

This application belongs to the field of communication technologies, and specifically, relates to a cell handover method and a terminal.

BACKGROUND

Most cell handovers are performed with the help of terminals. For example, a network device selects a target cell for a handover according to a measurement report reported by a terminal.

In the related art, a procedure of a cell handover is as follows: 1. A source cell indicates a handover, and transfers a handover request to a target cell. 2. The target cell performs admission control, provides a Radio Resource Control (RRC) configuration, and sends the Radio Resource Control configuration as a part of a handover approval to the source cell. 3. The source cell sends an RRC reconfiguration message, including a handover command, to a terminal device. 4. The terminal device establishes RRC connection with the target cell, and replies that the handover is completed.

It may be learned that, during the cell handover, the network device is required to send the RRC reconfiguration message to explicitly instruct the terminal to perform the handover, which results in a long latency and is not flexible enough.

SUMMARY

Embodiments of this application provide a cell handover method and a terminal.

According to a first aspect, a cell handover method is provided, including: determining, by a terminal according to a downlink control information DCI indicator, whether a cell handover trigger condition is met; and performing, by the terminal, a cell handover in a case that the cell handover trigger condition is met.

According to a second aspect, a terminal is provided, including: a determining module, configured to determine, according to a downlink control information DCI indicator, whether a cell handover trigger condition is met; and a handover module, configured to perform a cell handover in a case that the cell handover trigger condition is met.

According to a third aspect, a terminal is provided, including a processor, a memory, and a program or instructions stored in the memory and executable on the processor, where the program or the instructions, when executed by the processor, implements or implement the method according to the first aspect.

According to a fourth aspect, a readable storage medium is provided, storing a program or instructions, where the program or instructions, when executed by a processor, implements or implement the method according to the first aspect.

According to a fifth aspect, a chip is provided, including a processor and a communication interface, where the communication interface is coupled to the processor, and the processor is configured to run a program or instructions to implement the method according to the first aspect.

DETAILED DESCRIPTION

The following describes the embodiments of this application with reference to the accompanying drawings in the embodiments of this application. Apparently, the described embodiments are some but not all of the embodiments of this application.

In the specification and claims of this application, the terms "first," "second," and so on are intended to distinguish between similar objects but do not indicate a particular order or sequence. It should be understood that the terms so used may be interchanged in an appropriate condition, so that the embodiments of this application can be implemented in a sequence other than those illustrated or described herein. In addition, objects distinguished by "first" and "second" are usually a same type, and a quantity of the objects is not limited, for example, a first object may be one or may be a plurality. In addition, "and/or" in this specification and the claims indicates at least one of the connected objects. A character "/" usually indicates an "or" relationship between the associated objects.

It should be noted that, the technologies described in the embodiments of this application are not limited to a Long Term Evolution (LTE)/LTE-Advanced (LTE-A) system, and may be further applied to other wireless communication systems, such as Code Division Multiple Access (CDMA), Time Division Multiple Access (TDMA), Frequency Division Multiple Access (FDMA), Orthogonal Frequency Division Multiple Access (OFDMA), Single-Carrier Frequency-Division Multiple Access (SC-FDMA), and other systems. In the embodiments of this application, the terms "system" and "network" may usually be used interchangeably. The described technology can be applied to the systems and radio technologies mentioned above, and can also be applied to other systems and radio technologies. However, the following description describes a New Radio (NR) system for an exemplary objective, and uses NR terms in most of the following description. Such technologies may also be applied to applications except an NR system application, such as a 6th Generation (6G) communication system.

Figure 1:
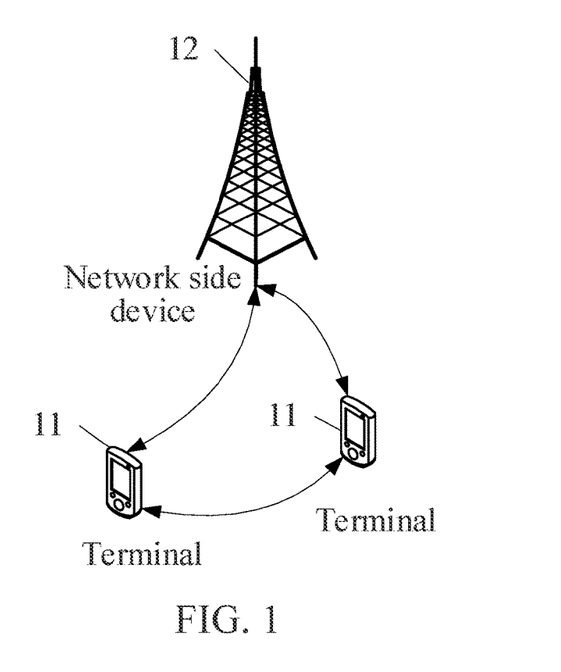
FIG. 1 is a block diagram of a wireless communication system according to an embodiment of this application.

FIG. 1 shows a block diagram of a wireless communication system to which the embodiments of this application are applicable. The wireless communication system includes a terminal 11 and a network device 12. The terminal 11 may also be referred to as a terminal device or a User Equipment (UE). The terminal 11 may be a mobile phone, a tablet personal computer, a laptop computer also referred to as a notebook computer, a Personal Digital Assistant (PDA), a palm personal computer, a netbook, an Ultra-Mobile Personal Computer (UMC), a Mobile Internet Device (MID), a wearable device or a Vehicle User Equipment (VUE), a Pedestrian User Equipment (PUE), or other terminal side devices. The wearable device includes: a smart watch, an earphone, glasses, and the like. It should be noted that, a specific type of the terminal 11 is not limited in the embodiments of this application. The network side device 12 may be a base station or a core network, where the base station may be referred to as a NodeB, an evolved NodeB, an access point, a Base Transceiver Station (BTS), a radio base station, a radio transceiver, a Basic Service Set (BSS), an Extended Service Set (ESS), a NodeB, an evolved NodeB (eNB), a next generation NodeB (gNB), a home NodeB, a home evolved NodeB, a WLAN access point, a Wi-Fi node, a Transmitting Receiving Point (TRP), or another suitable term in the field. As long as the same technical effects can be achieved, the base station is not limited by a specific technical term. It should be noted that, a base station in the NR system is merely used as an example in the embodiments of this application, but a specific type of the base station is not limited.

The following describes a cell handover method and a terminal provided in the embodiments of this application in detail with reference to the accompanying drawings by using specific embodiments and application scenarios thereof.

Figure 2:
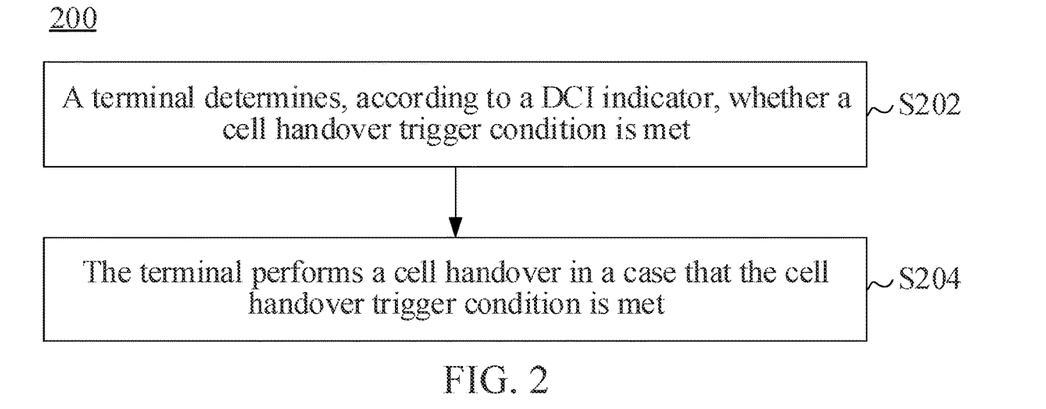
FIG. 2 is a schematic flowchart of a cell handover method according to an embodiment of this application.

As shown in FIG. 2, an embodiment of this application provides a cell handover method 200. The method may be performed by a terminal. In other words, the method may be performed by software or hardware installed on the terminal. The method includes the following steps.

S202: The terminal determines, according to a Downlink Control Information (DCI) indicator, whether a cell handover trigger condition is met.

S204: The terminal performs a cell handover in a case that the cell handover trigger condition is met.

The "cell handover" mentioned in this embodiment of this application may be a handover to a target cell or a target transmission and reception point. In a case of a handover to a target TRP, the cell handover may refer to an inter-cell MTRP handover or an intra-cell MTRP handover.

For the handover to a target TRP as mentioned above, the target TRIP may be a TRP in a neighbor cell under an inter-cell MTRP scenario, or may be a neighbor TRP in a local cell under an intra-cell MTRP scenario.

It should be noted that, the foregoing target cell may also refer to the target TRP. In other words, the foregoing target cell includes the target TRP. A serving cell and the target cell may be distinguished according to identifier information such as a Physical Cell Identifier (PCI), a COntrol REsource SET Pool Index (CORESET Pool Index), a TRP IDentifier (TRP ID), and a cell identifier of another type.

Before S202, the terminal may further perform Radio Resource Management (RRM) measurement, Radio Link Management (RLM) measurement, beam measurement, or the like according to configuration of a current serving cell. After completing the related measurement, the terminal may perform RRM reporting, RLM reporting, or beam reporting. According to measurement content reported by the terminal, a network side device may send DCI for configuration/updating/activation of some pieces of configuration information, so as to instruct the terminal device to perform a cell/TRP handover.

In this way, the terminal may perform the cell/TRP handover in the case that the cell handover trigger condition is met. In some implementations, the terminal device may connect Radio Resource Control (RRC) to the target cell/TRP, and replies that the handover is completed.

In this embodiment of this application, the terminal may determine, according to the DCI indicator, whether the cell handover trigger condition is met, and may perform the cell handover in the case that the cell handover trigger condition is met. In the embodiments, the DCI may be used for explicitly or implicitly instructing the terminal device to perform a cell handover, so that the characteristic of flexibility of DCI transmission is fully used, and a network device does not need to explicitly send RRC reconfiguration signaling, thereby improving flexibility of a system and reducing a latency of the cell handover.

That a reference signal is associated with/belongs to a specific cell/TRP, as mentioned in this embodiment of this application, may mean that a cell identifier of the specific cell/TRP is configured for the reference signal, quasi co-location information of the reference signal is associated with the specific cell/TRP, configuration information of the reference signal is configured by high layer signaling delivered by a control channel of the specific cell/TRP, the cell identifier of the specific cell/TRP is configured for a reference signal resource set to which the reference signal belongs, configuration information for channel state information configuration/channel state information reporting associated with the reference signal includes the cell identifier of the specific cell/TRP, or configuration information the cell/configuration information of a serving cell/common configuration information of the serving cell to which the reference signal belongs includes the cell identifier of the specific cell/TRP.

In some implementations, in the embodiment 200, the terminal may determine that the cell handover trigger condition is met according to at least one of the following:

1) A Transmission Configuration Indicator (TCI) indicated by DCI monitored on a first COntrol REsource SET (CORESET) is associated with a neighbor cell/neighbor TRP.

2) The DCI monitored on the first CORESET carries identifier information of the neighbor cell/neighbor TRP.

3) A Sounding Reference Signal (SRS) associated with a SRS Resource Indicator (SRI) indicated by the DCI monitored on the first CORESET is associated with the neighbor cell/neighbor TRP.

4) A Reference Signal (RS) in spatial correlation information of a Physical Uplink Control CHannel (PUCCH) resource indicated by the DCI monitored on the first CORESET is associated with the neighbor cell/neighbor TRP.

5) A Physical Uplink Shared CHannel (PUSCH) power control command indicated by the DCI monitored on the first CORESET is associated with the neighbor cell/neighbor TRP.

6) A PUCCH power control command indicated by the DCI monitored on the first CORESET is associated with the neighbor cell/neighbor TRP.

7) An SRS associated with an SRS request indicated by the DCI monitored on the first CORESET is associated with the neighbor cell/neighbor TRP.

8) A Channel State Information (CSI) configuration associated with a CSI request indicated by the DCI monitored on the first CORESET is associated with the neighbor cell/neighbor TRP.

9) A BandWidth Part (BWP) associated with a IMP indicator indicated by the DCI monitored on the first CORESET is associated with the neighbor cell/neighbor TRP.

10) A SRS power control command indicated by the DCI monitored on the first CORESET is associated with the neighbor cell/neighbor TRP.

In this embodiment, it is considered that: a CORESET is configuration information of a Physical Downlink Control CHannel (PDCCH) of the terminal, and if a specific CORESET (that is, the first CORESET) is associated with the neighbor cell/neighbor TRP, a better cell handover command can be constructed, and the terminal can be handed over to the neighbor cell/neighbor TRP without requiring the network side device to explicitly send an RRC reconfiguration message.

That the TCI indicated by DCI monitored by a first CORESET is associated with the neighbor cell/neighbor, as mentioned in the foregoing 1), may include: a reference signal indicated by the TCI is associated with the neighbor cell/neighbor TRP; or the TCI carries the identifier information of the neighbor cell/neighbor TRP.

The identifier information of the neighbor cell/neighbor TRP, for example, includes: a Physical Cell Identifier (PCI); a COntrol REsource SET Pool Index (CORESETPoolIndex), where CORESETPoolIndex may be used as a TRP identifier; a TRP ID; or a cell identifier of another type.

In some implementations, before the terminal determines, according to the DCI indicator, whether the cell handover trigger condition is met, the method further includes: receiving first configuration information, where the first configuration information is used for configuring at least one of the following:
  a) a Reference Signal (RS) indicated by a TCI, where the TCI may be the TCI indicated by the DO monitored on the first CORESET as mentioned in the foregoing 1);
  b) the SRS associated with the SRI, where for the SRI, reference may be made to the description in the foregoing 3);
  c) the spatial correlation information of the PUCCH resource;
  d) the PUSCH power control command;
  e) the PUCCH power control command;
  f) the SRS associated with the SRS request;
  g) the CSI configuration associated with the CSI request;
  h) the BWP associated with the BWP indicator; and
  i) the SRS power control command.

In this embodiment, the network side device may configure at least one of the following for the terminal in advance: the RS indicated by the TCI; an RS indicated by the SRI (that is, the SRS associated with the SRI as mentioned above); the spatial correlation information of the PUCCH resource; the PUSCH power control command; the PUCCH power control command; the SRS associated with the SRS request; the CSI configuration associated with the CSI request; and the BWP associated with the BWP indicator. In some implementations, the PUSCH power control command and the PUCCH power control command are scheduled by a DCI format (format) 2-2, and the SRS power control command is scheduled by a DCI format 2-3.

In some implementations, for example, some TCIs/SRIs are configured on the network side device to indicate RSs of the local cell, and some other TCIs/SRIs are configured on the network side device to indicate RSs of the neighbor cell/TRP. However, the TCI/SRI previously indicating the neighbor cell/TRP is not indicated by DCI, and therefore, can be indicated by the DCI in S202, so that the terminal can determine, according to the DCI indicator, that the cell handover trigger condition is met.

In another example, some PUCCH resources are configured on the network side device. Spatial correlation information is configured for the PUCCH resources, some RSs in the spatial correlation information indicate RSs of the local cell, and some other RSs in the spatial correlation information indicate RSs of the neighbor cell/TRP. However, the PUCCH resource of the neighbor cell/TRP that is previously indicated by an RS in the spatial correlation information is not indicated by DCI, and therefore, can indicated by the DCI in S202, so that the terminal can determine that the cell handover trigger condition is met according to the DCI indicator.

In another example, some CSI requests are configured on the network side device. The CSI requests are associated with some CSI configurations, where some of the CSI configurations are associated with the neighbor cell/TRP. For example, a cell identifier of the neighbor cell/TRP is configured for the CSI configurations. In another example, the RS of the neighbor cell/TRP is configured for the CSI configurations.

In another example, some BWP indicators are configured on the network side device is, where the BWP indicators are associated with some BWPs, and some of the BWPs are associated with the neighbor cell/TRP. For example, the cell identifier of the neighbor cell/TRP is configured for the BWPs.

In some implementations, for the DCI monitored on the first CORESET as mentioned in the foregoing 1) to 9), at least one of a beam or a pathloss reference reference signal associated with the Physical Uplink Control CHannel (PUCCH) resource associated with the DCI and the neighbor cell/neighbor TRP indicated by or associated with the DCI belong to a same cell/TRP.

For the PUCCH associated with the DCI as mentioned above, the PUCCH may be used for reporting an ACK/NACK associated with the DCI, reporting Channel State Information (CSI), and the like.

In some implementations, after the terminal performs the cell handover in the case that the cell handover trigger condition is met, the method further includes: using a beam of a target cell/target TRP after the cell handover or a beam of a source cell/source TRP before the cell handover during retransmission of a target signal or channel, where the target signal or channel is a signal or channel indicated by or associated with the DCI. The DCI mentioned herein may be the DCI monitored on the first CORESET as mentioned in the foregoing 1) to 9).

In some implementations, that the terminal performs the cell handover in the case that the cell handover trigger condition is met, as mentioned in the foregoing embodiments, includes: performing a cell handover on a first TRP, where in a case of multi-DCI Multiple Transmission and Reception Points (MTRP), the first TRP is a TRP on which the first CORESET is located; or in a case of single-DCI MTRP, a TCI of the first TRP is associated with the neighbor cell, or a TO code point of the first TRP is 0 or the lowest.

The TRP on which the first CORESET is located as mentioned above may be obtained according to CORESETPoolIndex of the first CORESET or another TRP identifier.

For the MTRP with a single piece of DCI as mentioned above, a TCI code point indicated by the DCI includes N TCI states. The N TCI states correspond to N TRPs respectively, where N is a positive integer and may be a sum of the MTRP.

That the TCI of the first TRP is associated with the neighbor cell, as mentioned above, for example, includes: the reference signal indicated by the TCI is associated with the neighbor cell, or the TCI carries the Physical Cell Identifier (PCI) of the foregoing neighbor cell or information associated with the PCI or the like.

It should be noted that, the "performing a cell handover on the first TRP," as mentioned in the embodiments of this application, may be understood as that: a cell associated with the first TRP becomes a target cell, cell configuration information used by the first TRP becomes cell configuration information of a target cell, a cell associated with a CORESET of the first TRP becomes a target cell, a cell associated with the CORESET of the first TRP becomes a target cell, or cell configuration information associated with the CORESET of the first TRP becomes cell configuration information of a target cell. The first TRP may be a source TRP of the terminal before the cell handover, and the performing a cell handover on the first TRP means that the terminal does not use configuration information of the source cell before the handover any more, and the configuration information may include high layer configuration information and/or physical layer configuration information.

The terminal may use configuration information of a target cell or a target TRP after a handover. The configuration information may include high layer configuration information and/or physical layer configuration information. In some implementations, the high layer configuration information includes at least one of the following: a cell group configuration CellGroupConfig; a special cell configuration SpCellConfig; a reconfiguration with synchronization ReconfigurationWithSync; a serving cell common configuration ServingCellConfigCommon; or a serving cell configuration ServingCellConfig. In some implementations, the physical layer configuration information includes at least one of the following: Transmission Configuration Indication (TCI) information; Quasi Co-Location (QCL) information; a PathLoss reference RS (PL RS); a Random Access CHannel (RACH) resource; scrambling code information; timing information, that is, Timing information; and timing advance information, that is, Timing Advance information.

In some implementations, that the terminal performs the cell handover in a case that the cell handover trigger condition is met, as mentioned in the foregoing embodiments, includes one of the following: 1) performing a cell handover on the first TRP when the first TRP is a special TRP; or 2) performing a cell handover on the first TRP when the first TRP is not a special TRP.

In a case of multi-DCI MTRP, the first TRP is a TRP on which the first CORESET is located; or in a case of single-DCI MTRP, a TCI of the first TRP is associated with the neighbor cell, or a TCI code point of the first TRP is 0 or the lowest.

In some implementations, the two embodiments further include one of the following steps: 1) performing a cell handover on a second TRP; 2) skipping performing a cell handover on the second TRIP; 3) performing a cell handover on the second TRP when the terminal and/or the network side device support or supports inter-cell MRTP; or 4) skipping performing a cell handover the second TRP when the terminal and/or the network side device do or does not support the inter-cell MRTP.

The second TRP is at least one TRP other than the first TRP in a cell to which the first TRIP belongs. For example, there are a plurality of TRPs other than the first TRP in the cell to which the first TRP belongs, the second TRP may be all TRPs, any TRP, a TRP with a lowest TRP identifier, a TRIP with a highest TRP identifier, a TRP indicated by a network, a TRP reported by a UE, a TRP agreed by a protocol, a TRP associated with a special CORESET (or CORESET with lowest ID, and/or CORESET with highest ID, or CORESET with common search space), or the like in the TRPs.

It should be noted that, for "performing a cell handover on a second TRP," as mentioned in the embodiments of the specification, refer to the foregoing description of "performing a cell handover on the first TRP". In some implementations, the second TRP may be a neighbor TRP of the terminal before the cell handover. For example, the performing a cell handover on a second TRP means that the second TRP does not use previous configuration information any more, and the configuration information may include high layer configuration information and/or physical layer configuration information.

The performing a cell handover on the second TRP when the terminal and/or a network side device support or supports inter-cell MRTP, as mentioned in the foregoing 3), includes: performing the cell handover on the second TRP when the terminal and/or the network side device support or supports the inter-cell MRTP and the neighbor cell meets a condition for the inter-cell MRTP.

In this embodiment, that the neighbor cell meets a condition for the inter-cell MRTP includes at least one of the following: timing information of the neighbor cell meets a first condition; and cell quality of the neighbor cell meets a second condition.

That the timing information of the neighbor cell meets the first condition, as mentioned in this embodiment, includes: the timing information of the neighbor cell falls within a specific range, or a difference between the timing information of the neighbor cell and timing information of the local cell falls within a specific range.

That the cell quality of the neighbor cell meets the second condition, as mentioned in this embodiment, includes: for example, the cell quality of the neighbor cell falls within a specific range, or a difference between the cell quality of the neighbor cell and cell quality of the local cell falls within a specific range. The cell quality mentioned above may include a layer 1 result and/or a layer 3 result, and may include at least one of the following: a Signal to Interference plus Noise Ratio (SINR), a Reference Signal Received Power (RSRP), and Reference Signal Receiving Quality (RSRQ).

In some implementations, that the terminal performs the cell handover, as mentioned in the foregoing embodiment, includes at least one of the following:

1) Hand an anchor node over to the target cell/target TRP.

2) Perform a handover from a cell associated with a TRP of a non-anchor node to the target cell/target TRP in a case that the anchor node remains unchanged, and there are a plurality of TRPs.

In the embodiments of the specification, the TRP ID may be a CORESETPoolIndex, and the plurality of TRPs means that a value of CORESETPoolIndex is greater than 0.

3) Use second configuration information of the target cell/target TRP.

In this example, the second configuration information of the target cell/target TRP may include high layer configuration information and/or physical layer configuration information.

a) The high layer configuration information includes at least one of the following: a cell group configuration CellGroupConfig; a special cell configuration SpCellConfig; a reconfiguration with synchronization ReconfigurationWith- Sync a serving cell common configuration ServingCellConfigCommon; or a serving cell configuration ServingCellConfig.

b) The physical layer configuration information includes at least one of the following: Transmission Configuration Indication (TCI) information; Quasi Co-Location (QCL) information; a PathLoss reference RS (PL RS); a Random Access CHannel (RACH) resource; scrambling code information; timing information; and timing advance information.

In some implementations, the foregoing quasi co-location information includes default beam information. A reference signal associated with the default beam includes at least one of the following: a Synchronization Signal and PBCH Block (SSB) when a cell is accessed initially; a quasi co-location reference signal of a lowest-numbered CORESET associated with an active BWP; a quasi co-location reference signal of a lowest-numbered CORESET associated with an active BWP, where the active BWP corresponds to a TRP; a quasi co-location reference signal of a lowest-numbered TCI associated with an active IMP; and a quasi co-location reference signal of a lowest-numbered active TCI associated with an active BWP.

In some implementations, for the foregoing PL RS, when a network does not configure a PL RS of a corresponding channel or signal, and/or the network activates use of a default PL RS, and/or the network does not configure spatial correlation information of the corresponding channel or signal, the PL RS includes the default PL RS. In some implementations, the default PL RS is same as the reference signal associated with the default beam, or uses a set or rule the same as that of the reference signal associated with the default beam.

4) Associate at least one CORESET with the target cell/target TRP. For example, any CORESET is handed over to/associated with the target cell/neighbor cell.

5) Associate the first CORESET with the target cell/target TRP.

In some implementations, the first CORESET is at least one of the following: a CORESET numbered 0; a lowest-numbered CORESET; a highest-numbered CORESET; a CORESET associated with a common search space; a CORESET indicated by the network side device; a CORESET reported by the terminal; a CORESET associated with the special TRP; a predefined CORESET; any CORESET; or at least two CORESETs.

6) Hand the first TRP over to the target cell/neighbor cell or associate the first TRP with the target cell/neighbor cell.

The first TRP includes at least one of the following: a TRP with an ID of 0, a lowest ID, or a highest ID; a TRP indicated by a network, a TRP reported by UE, or a default TRP of a protocol; or a TRP associated with a special CORESET (or CORESET with lowest ID, and/or CORESET with highest ID, or CORESET with common search space).

7) Associate the PDDCH with the target cell/target TRP.

8) Perform a handover from a special cell (SpCell, including a primary cell and a primary secondary cell) to the target cell.

9) Associate network node identifier information associated with a control resource set pool index (CORESET-PoolIndex) with the target cell/target TRP.

It should be noted that, in the cell handover method provided in this embodiment of this application may be performed by a terminal or a control module configured to perform the cell handover method in the terminal. In this embodiment of this application, a terminal provided in this embodiment of this application is described by using an example in which the terminal performs the cell handover method.

Figure 3:
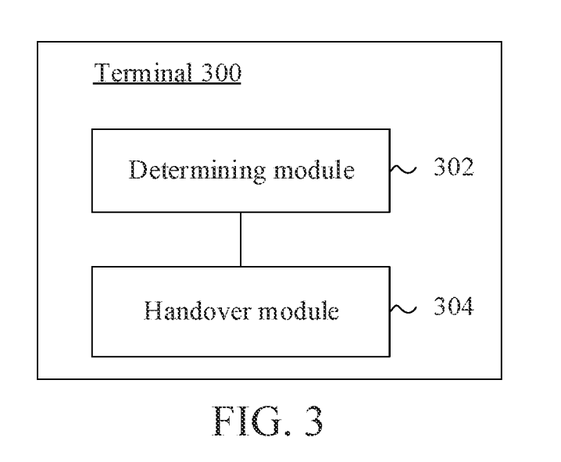
FIG. 3 is a schematic structural diagram of a terminal according to an embodiment of this application.

FIG. 3 is a schematic structural diagram of a terminal according to an embodiment of this application. As shown in FIG. 3, a terminal 300 includes the following modules.

A determining module 302 may be configured to determine, according to a DCI indicator, whether a cell handover trigger condition is met.

A handover module 304 may be configured to perform a cell handover in a case that the cell handover trigger condition is met.

In this embodiment of this application, the terminal may determine, according to the DCI indicator, whether the cell handover trigger condition is met, and may perform the cell handover in the case that the cell handover trigger condition is met. In the embodiments, the DCI may be used for explicitly or implicitly instructing the terminal device to perform a cell handover, so that the characteristic of flexibility of DCI transmission is fully used, and a network device does not need to explicitly send RRC reconfiguration signaling, thereby improving flexibility of a system and reducing a latency of the cell handover.

In some implementations, the determining module 302 determines, according to at least one of the following, that the cell handover trigger condition is met:

1) A TCI indicated by DCI monitored on a first CORESET is associated with a neighbor cell/neighbor TRP.

2) The DCI monitored on the first CORESET carries identifier information of the neighbor cell/neighbor TRP.

3) A SRS associated with a sounding reference signal resource indicator indicated by the DCI monitored on the first CORESET is associated with the neighbor cell/neighbor TRP.

4) A RS in spatial correlation information of a PUCCH resource indicated by the DCI monitored on the first CORESET is associated with the neighbor cell/neighbor TRP.

5) A PUSCH power control command indicated by the DCI monitored on the first CORESET is associated with the neighbor cell/neighbor TRP.

6) A PUCCH power control command indicated by the DCI monitored on the first CORESET is associated with the neighbor cell/neighbor TRP.

7) An SRS associated with an SRS request indicated by the DCI monitored on the first CORESET is associated with the neighbor cell/neighbor TRP.

8) A CSI configuration associated with a CSI request indicated by the DCI monitored on the first CORESET is associated with the neighbor cell/neighbor TRP.

9) A BWP associated with a BWP indicator indicated by the DCI monitored on the first CORESET is associated with the neighbor cell/neighbor TRP.

10) A SRS power control command indicated by the DCI monitored on the first CORESET is associated with the neighbor cell/neighbor TRP.

In some implementations, that the TCI is associated with the neighbor cell/neighbor TRP includes: a RS indicated by the TCI is associated with the neighbor cell/neighbor TRP; or the TCI carries the identifier information of the neighbor cell/neighbor TRP.

In some implementations, the terminal 300 further includes: a receiving module, configured to receive first configuration information, where the first configuration information is used for configuring at least one of the following: an RS indicated by the TCI; the SRS associated with the sounding reference signal resource indicator; the spatial correlation information of the PUCCH resource; the PUSCH power control command; the PUCCH power control command; the SRS associated with the SRS request; the CSI configuration associated with the CSI request; the BWP associated with the BWP indicator; and the SRS power control command.

In some implementations, at least one of a beam or a pathless reference reference signal associated with the PUCCH resource associated with the DCI and the neighbor cell/neighbor TRP indicated by or associated with the DO belong to a same cell/TRP.

In some implementations, the terminal 300 further includes: a transmission module, configured to use a beam of a target cell/target TRP after the cell handover or a beam of a source cell/source TRP before the cell handover, during retransmission of a target signal or channel, where the target signal or channel is a signal or channel indicated by or associated with the DCI.

In some implementations, in an embodiment, the handover module 304 is configured for: performing a cell handover on a first TRP, where in a case of multi-DCI MTRP, the first TRP is a TRP on which the first CORESET is located; or in a case of single-DCI MTRP, a TCI of the first TRP is associated with the neighbor cell, or a TCI code point of the first TRP is 0 or the lowest.

In some implementations, the handover module 304 is configured for one of the following: performing a cell handover on the first TRP when a first TRP is a special TRP; or performing a cell handover on the first TRP when the first TRP is not a special TRP, where in a case of multi-DCI MTRP, the first TRP is a TRP on which the first CORESET is located; or in a case of single-DCI MTRP, a TCI of the first TRP is associated with the neighbor cell, or a TCI code point of the first TRP is 0 or the lowest.

In some implementations, the handover module 304 is configured for one of the following: performing a cell handover on a second TRP; skipping performing a cell handover on the second TRP; performing a cell handover on the second TRP when the terminal and/or a network side device support or supports inter-cell MRTP; or skipping performing a cell handover on the second TRP when the terminal and/or the network side device do or does not support the inter-cell MRTP, where the second TRP is at least one TRP other than the first TRP in a cell to which the first TRP belongs.

In some implementations, the performing a cell handover on the second TRP when the terminal and/or a network side device support or supports inter-cell MRTP includes:

performing the cell handover on the second TRP when the terminal and/or the network side device support or supports the inter-cell MRTP and the neighbor cell meets a condition for the inter-cell MRTP.

In some implementations, the performing a cell handover includes at least one of the following: handing an anchor node over to a target cell/target TRP; performing, in a case that the anchor node remains unchanged, and there are a plurality of TRPs, a handover from a cell associated with a TRP of a non-anchor node to the target cell/target TRP; using second configuration information of the target cell/target TRP; associating at least one CORESET with the target cell/target TRP; associating the first CORESET with the target cell/target TRP; handing the first TRP over to the target cell/neighbor cell or associating the first TRP with the target cell/neighbor cell; associating a PDCCH with the target cell/target TRP; performing a handover from a special cell to the target cell; or associating network node identifier information associated with a control resource set pool index with the target cell/target TRP.

In some implementations, the first CORESET includes one of the following: a CORESET numbered 0; a lowest-numbered CORESET; a highest-numbered CORESET, a CORESET associated with a common search space; a CORESET indicated by the network side device; a CORESET reported by the terminal; a CORESET associated with the special TRP; a predefined CORESET; any CORESET; or at least two CORESETs.

For the terminal device 300 according to this embodiment of this application, refer to the procedures of the method 200 corresponding to this embodiment of this application. In addition, units/modules in the terminal 300 and the foregoing other operations and/or functions are respectively for implementing corresponding procedures in the method 200, and may produce the same or equivalent technical effects. For brevity, details are not described herein again.

In some implementations, the terminal in this embodiment of this application may be a component, an integrated circuit, or a chip in a terminal. The apparatus may be a mobile terminal or may be a non-mobile terminal. For example, the mobile terminal may include, but not limited to, the foregoing enumerated types of the terminal 11, and the non-mobile terminal may be a server, a Network Attached Storage (NAS), a personal computer, a television, a teller machine, a self-service machine, or the like. This is not specifically limited in this embodiment of this application.

The terminal in this embodiment of this application may be an apparatus with an operating system. The operating system may be an Android operating system, may be an iOS operating system, or may be another possible operating system, and is not specifically limited in the embodiments of this application.

The terminal provided in this embodiment of this application can implement the processes implemented by the method embodiment shown in FIG. 2, and achieve the same technical effects. To avoid repetition, details are not described herein again.

Figure 4:
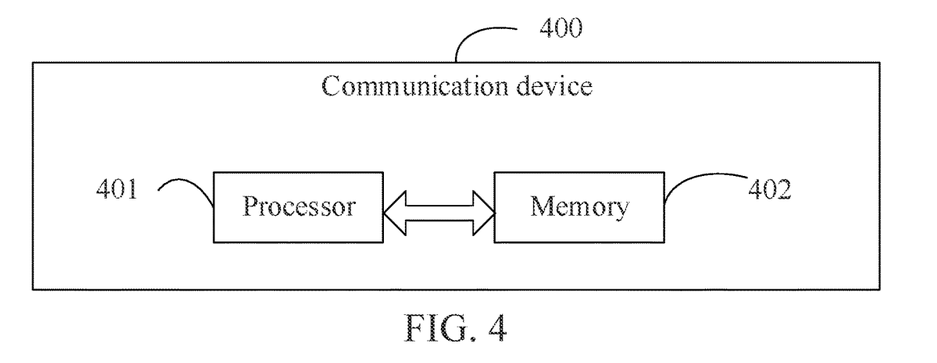
FIG. 4 is a schematic structural diagram of a communication device according to an embodiment of this application.

In some implementations, as shown in FIG. 4, an embodiment of this application further provides a communication device 400, including a processor 401, a memory 402, and a program or instructions stored in the memory 402 and executable on the processor 401. For example, when the communication device 400 is a terminal, the program or the instructions, when executed by the processor 401, implements or implement the processes of the embodiments of the foregoing cell handover method, and can achieve the same technical effects.

Figure 5:
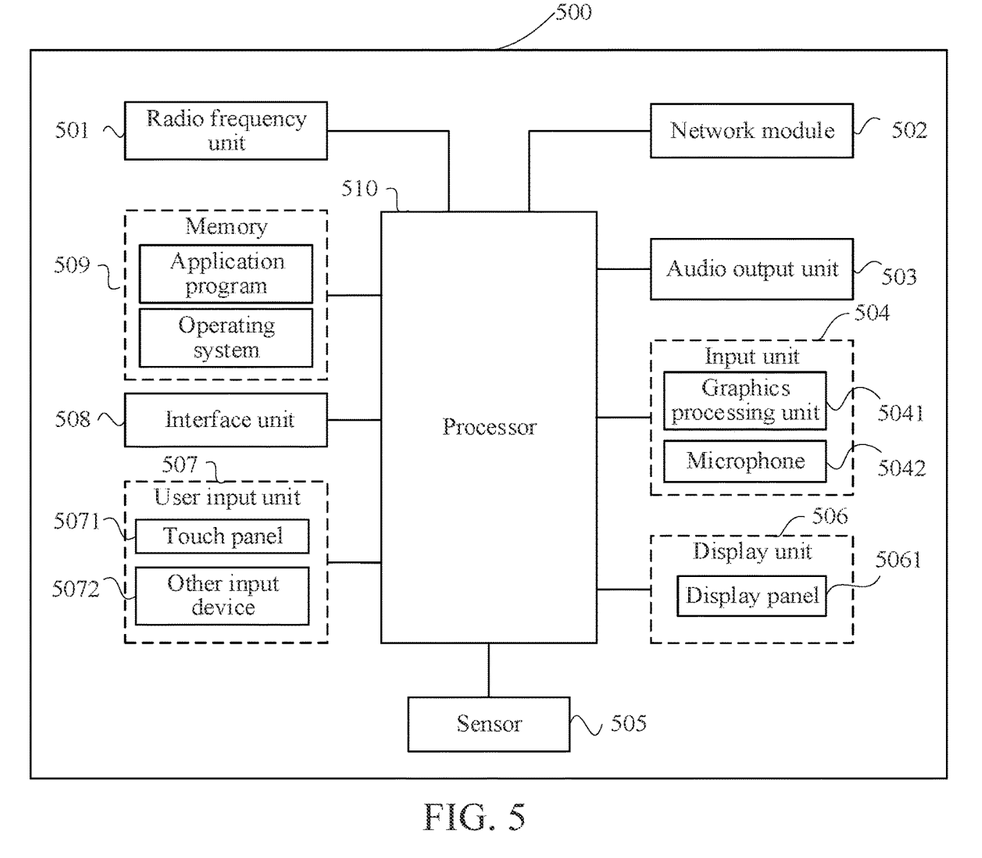
FIG. 5 is a schematic structural diagram of a terminal according to an embodiment of this application.

FIG. 5 is a schematic diagram of a hardware structure of a terminal for implementing an embodiment of this application.

The terminal 500 includes but is not limited to: components such as a radio frequency unit 501, a network module 502, an audio output unit 503, an input unit 504, a sensor 505, a display unit 506, a user input unit 507, an interface unit 508, a memory 509, and a processor 510.

A person skilled in the art may understand that, the terminal 500 may further include a power supply (such as a battery) for supplying power to the components. The power supply may be logically connected to the processor 510 by using a power management system, thereby implementing functions such as charging, discharging, and power consumption management by using the power supply management system. The terminal structure shown in FIG. 5 constitutes no limitation on the terminal, and the terminal may include more or fewer components than those shown in the figure, or some components may be combined, or a different component deployment may be used. Details are not described herein again.

It should be understood that, in this embodiment of this application, the input unit 504 may include a Graphics Processing Unit (GPU) 5041 and a microphone 5042. The graphics processing unit 5041 performs processing on image data of a static picture or a video that is obtained by an image acquisition device (for example, a camera) in a video acquisition mode or an image acquisition mode. The display unit 506 may include a display panel 5061, the display panel 5061 may be configured in a form such as a liquid crystal display or an organic light-emitting diode. The user input unit 507 includes a touch panel 5071 and another input device 5072. The touch panel 5071 is also referred to as a touch screen. The touch panel 5071 may include two parts: a touch detection apparatus and a touch controller. The another input device 5072 may include, but not limited to, a physical keyboard, a functional key (such as a volume control key or a switch key), a track ball, a mouse, and a joystick, Details are not described herein again.

In this embodiment of this application, the radio frequency unit 501 receives downlink data from a network side device, and sends the downlink data to the processor 510 to be processed. In addition, the radio frequency unit 501 sends uplink data to the network side device. The radio frequency unit 501 usually includes but is not limited to an antenna, at least one amplifier, a transceiver, a coupler, a low noise amplifier, a duplexer, and the like.

The memory 509 may be configured to store a software program or an instruction and various data. The memory 509 may mainly include a program storage or instruction area and a data storage area. The program storage or instruction area may store an operating system, an application or an instruction required by at least one function (for example, a sound playing function and an image playing function), or the like. In addition, the memory 509 may include a cache random access memory, and may further include a non-volatile memory. The non-volatile memory may be a Read-Only Memory (ROM), a Programmable ROM (PROM), an Erasable PROM (EPROM), an Electrically EPROM (EEPROM), or a flash memory, for example, at least one magnetic disk storage device, a flash storage device, or other non-volatile solid-state storage devices.

The processor 510 may include one or more processing units. In some implementations, the processor 510 may integrate an application processor and a modem processor. The application processor mainly processes an operating system, a user interface, an application or an instruction, and the like. The modem processor mainly processes wireless communication, such as a baseband processor. It may be understood that the modem processor may either not be integrated into the processor 510.

The processor 510 is configured to determine, according to a DCI indicator, whether a cell handover trigger condition is met; and perform a cell handover in a case that the cell handover trigger condition is met.

In this embodiment of this application, the terminal may determine, according to the DCI indicator, whether the cell handover trigger condition is met, and may perform the cell handover in the case that the cell handover trigger condition is met. In the embodiments, the DCI may be used for explicitly or implicitly instructing the terminal device to perform a cell handover, so that the characteristic of flexibility of DCI transmission is fully used, and a network device does not need to explicitly send RRC reconfiguration signaling, thereby improving flexibility of a system and reducing a latency of the cell handover.

The terminal provided in this embodiment of this application may further implement the processes of the embodiments of the foregoing cell dover method, To avoid repetition, details are not described herein again.

An embodiment of this application further provides a readable storage medium, storing a program or instructions, where the program or instructions, when executed by a processor, implements or implement the processes of the embodiments of the cell handover method, and can achieve the same technical effects. To avoid repetition, details are not described herein again.

The processor may be the processor in the terminal of the foregoing embodiments. The readable storage medium includes a computer-readable storage medium, for example, a computer Read-Only Memory (ROM), a Random Access Memory (RAM), a magnetic disk, or an optical disc.

An embodiment of this application further provides a chip, including a processor and a communication interface, where the communication interface is coupled to the processor, and the processor is configured to run a program or instructions to implement the processes of the embodiments of the cell handover method. To avoid repetition, details are not described herein again.

It should be understood that, the chip mentioned in this embodiment of this application may also be referred to as a system-level chip, a system chip, a chip system, a system-on-chip, or the like.

An embodiment of this application further provides a computer program product, stored in a non-volatile memory, where the computer program product is executed by at least one processor to implement the processes of the embodiments of the cell handover method. To avoid repetition, details are not described herein again.

An embodiment of this application further provides a communication device, configured to perform the processes of the embodiments of the foregoing cell handover method. To avoid repetition, details are not described herein again.

It should be noted that, in this specification, terms "include," "comprise," and any variants thereof are intended to cover a non-exclusive inclusion. Therefore, a process, a method, an object, or an apparatus that includes a series of elements only includes such elements, but also includes other elements not specified expressly, or may include inherent elements of the process, method, object, or apparatus. Without more limitations, elements defined by the sentence "including one" does not exclude that there are still other same elements in the processes, methods, objects, or apparatuses that include such elements. In addition, it should be noted that, the scope of the method and the apparatus in the embodiments of this application is not limited to a shown sequence or a discussed sequence to perform functions, and may further include performing functions in a basically simultaneous manner or a converse sequence based on the involved functions, for example, the described method may be performed in a sequence different from the description, and various steps may be added, removed, or combined. In addition, features described by referring to some examples may be combined in other examples.

Through the foregoing description in the foregoing implementations, a person skilled in the art can learn that the foregoing embodiment methods may be implemented by using software in combination with a necessary universal hardware platform. Certainly, the embodiment methods may be implemented by using hardware, but the former is a better implementation in many cases. Based on such an understanding, the technical solutions of this application essentially or the part contributing to the prior art may be implemented in a form of a software product. The computer software product is stored in a storage medium (such as a ROM/RAM, a magnetic disk, or an optical disc) and includes several instructions for instructing a terminal (which may be a mobile phone, a computer, a server, an air conditioner, a network device, or the like) to perform the methods described in the embodiments of this application.

The embodiments of this application have been described above with reference to the accompanying drawings. This application is not limited to the specific embodiments described above, and the specific embodiments described above are merely exemplary and not limitative. Those of ordinary skill in the art may make various variations under the teaching of this application without departing from the spirit of this application and the protection scope of the claims, and such variations shall all fall within the protection scope of this application.

What is claimed is:

1. A cell handover method, comprising:
determining, by a terminal, according to a Downlink Control Information (DCI) indicator, whether a cell handover trigger condition is met; and
performing, by the terminal, a cell handover when the cell handover trigger condition is met,
wherein that the cell handover trigger condition is met is determined according to at least one of the following:
a Transmission Configuration Indicator (TCI) indicated by DCI monitored on a first Control REsource SET (CORESET) is associated with a neighbor cell or neighbor Transmission and Reception Point (TRP);
the DCI monitored on the first CORESET carries identifier information of the neighbor cell or the neighbor TRP;
a Sounding Reference Signal (SRS) associated with an SRS resource indicator indicated by the DCI monitored on the first CORESET is associated with the neighbor cell or the neighbor TRP;
a Reference Signal (RS) in spatial correlation information of a Physical Uplink Control CHannel (PUCCH) resource indicated by the DCI monitored on the first CORESET is associated with the neighbor cell or the neighbor TRP;
a Physical Uplink Shared CHannel (PUSCH) power control command indicated by the DCI monitored on the first CORESET is associated with the neighbor cell or the neighbor TRP;
a PUCCH power control command indicated by the DCI monitored on the first CORESET is associated with the neighbor cell or the neighbor TRP;
an SRS associated with an SRS request indicated by the DCI monitored on the first CORESET is associated with the neighbor cell or the neighbor TRP;
a Channel State Information (CSI) configuration associated with a CSI request indicated by the DCI monitored on the first CORESET is associated with the neighbor cell or the neighbor TRP;
a BandWidth Part (BWP) associated with a BWP indicator indicated by the DCI monitored on the first CORESET is associated with the neighbor cell or the neighbor TRP; or
an SRS power control command indicated by the DCI monitored on the first CORESET is associated with the neighbor cell or the neighbor TRP.

2. The method according to claim 1, wherein that the TCI is associated with the neighbor cell or the neighbor TRP comprises:
an RS indicated by the TCI is associated with the neighbor cell or the neighbor TRP; or
the TCI carries the identifier information of the neighbor cell or the neighbor TRP.

3. The method according to claim 1, wherein before the determining, by a terminal according to a DCI indicator, whether a cell handover trigger condition is met, the method further comprises: receiving first configuration information, wherein the first configuration information is used for configuring at least one of the following:
an RS indicated by the TCI;
the SRS associated with the SRS resource indicator;
the spatial correlation information of the PUCCH resource;
the PUSCH power control command;
the PUCCH power control command;
the SRS associated with the SRS request;
the CSI configuration associated with the CSI request;
the BWP associated with the BWP indicator; or
the SRS power control command.

4. The method according to claim 1, wherein at least one of a beam or a PathLoss Reference Signal (PL RS) associated with the PUCCH resource associated with the DCI and the neighbor cell or the neighbor TRP indicated by or associated with the DCI belong to a same cell or TRP.

5. The method according to claim 1, wherein after the performing, by the terminal, a cell handover when the cell handover trigger condition is met, the method further comprises:
using a beam of a target cell or a target TRP after the cell handover or a beam of a source cell or a source TRP before the cell handover during retransmission of a target signal or channel, wherein
the target signal or channel is a signal or channel indicated by or associated with the DCI.

6. The method according to claim 1, wherein the performing, by the terminal, a cell handover when the cell handover trigger condition is met comprises:
performing a cell handover on a first TRP, wherein
in a case of multi-DCI Multiple Transmission and Reception Points (MTRP), the first TRP is a TRP on which the first CORESET is located; or in a case of single-DCI MTRP, a TCI of the first TRP is associated with the neighbor cell, or a TCI code point of the first TRP is 0 or the lowest.

7. The method according to claim 1, wherein the performing, by the terminal, a cell handover when the cell handover trigger condition is met comprises one of the following:
performing a cell handover on a first TRP when the first TRP is a special TRP; or
performing a cell handover on the first TRP when the first TRP is not a special TRP, wherein
in a case of multi-DCI MTRP, the first TRP is a TRP on which the first CORESET is located; or in a case of single-DCI MTRP, a TCI of the first TRP is associated with the neighbor cell, or a TCI code point of the first TRP is 0 or the lowest.

8. The method according to claim 6, wherein the method further comprises one of the following:
performing a cell handover on a second TRP;
skipping performing a cell handover on the second TRP;
performing a cell handover on the second TRP when the terminal or a network side device support or supports inter-cell MRTP; or skipping performing a cell handover on the second TRP when the terminal or the network side device do or does not support the inter-cell MRTP, wherein the second TRP is at least one TRP other than the first TRP in a cell to which the first TRP belongs.

9. The method according to claim 8, wherein the performing a cell handover on the second TRP when the terminal or a network side device support or supports inter-cell MRTP comprises:

performing the cell handover on the second TRP when the terminal or the network side device support or supports the inter-cell MRTP and the neighbor cell meets a condition for the inter-cell MRTP.

10. The method according to claim 9, wherein that the neighbor cell meets the condition for the inter-cell MRTP comprises at least one of the following:

timing information of the neighbor cell meets a first condition; or cell quality of the neighbor cell meets a second condition.

11. The method according to claim 1, wherein the performing, by the terminal, a cell handover comprises at least one of the following:

handing an anchor node over to a target cell or a target TRP;

performing, when the anchor node remains unchanged, and there are a plurality of TRPs, a handover from a cell associated with a TRP of a non-anchor node to the target cell or the target TRP;

using second configuration information of the target cell or the target TRP;

associating at least one CORESET with the target cell or the target TRP;

associating a first CORESET with the target cell or the target TRP;

handing a first TRP over to the target cell or a neighbor cell, or associating the first TRP with the target cell or the neighbor cell;

associating a Physical Downlink Control CHannel (PDCCH) with the target cell or the target TRP;

performing a handover from a special cell to the target cell; or associating network node identifier information associated with a control resource set pool index with the target cell or the target TRP.

12. The method according to claim 11, wherein the second configuration information of the target cell or the target TRP comprises at least one of the following:

a cell group configuration;
a special cell configuration;
a reconfiguration with synchronization;
a serving cell common configuration;
a serving cell configuration;
a TCI;
Quasi Co-Location (QCL) information;
a pathloss reference reference signal;
a Random Access CHannel (RACH) resource;
scrambling code information;
timing information; or
timing advance information.

13. The method according to claim 1, wherein the first CORESET comprises one of the following:

a CORESET numbered 0;
a lowest-numbered CORESET;
a highest-numbered CORESET;
a CORESET associated with a common search space;
a CORESET indicated by a network side device;
a CORESET reported by the terminal;

a CORESET associated with a special TRP;
a predefined CORESET;
any CORESET; or
at least two CORESETs.

14. The method according to claim 7, wherein the special TRP comprises one of the following:

a TRP numbered 0;
a lowest-numbered TRP;
a highest-numbered TRP;
a TRP associated with a common search space;
a TRP indicated by a network side device;
a TRP reported by the terminal;
a predefined TRP; or
a TRP associated with a special CORESET, wherein the special CORESET is numbered 0, is lowest-numbered, is highest-numbered, or is associated with the common search space.

15. A terminal, comprising:

a memory storing computer-readable instructions; and
a processor coupled to the memory and configured to execute the computer-readable instructions, wherein the computer-readable instructions, when executed by the processor, cause the processor to perform operations comprising:

determining, according to a Downlink Control Information (DCI) indicator, whether a cell handover trigger condition is met; and performing a cell handover when the cell handover trigger condition is met, wherein that the cell handover trigger condition is met is determined according to at least one of the following:

a Transmission Configuration Indicator (TCI) indicated by DCI monitored on a first Control REsource SET (CORESET) is associated with a neighbor cell or neighbor Transmission and Reception Point (TRP);

the DCI monitored on the first CORESET carries identifier information of the neighbor cell or the neighbor TRP;

a Sounding Reference Signal (SRS) associated with an SRS resource indicator indicated by the DCI monitored on the first CORESET is associated with the neighbor cell or the neighbor TRP;

a Reference Signal (RS) in spatial correlation information of a Physical Uplink Control CHannel (PUCCH) resource indicated by the DCI monitored on the first CORESET is associated with the neighbor cell or the neighbor TRP;

a Physical Uplink Shared CHannel (PUSCH) power control command indicated by the DCI monitored on the first CORESET is associated with the neighbor cell or the neighbor TRP;

a PUCCH power control command indicated by the DCI monitored on the first CORESET is associated with the neighbor cell or the neighbor TRP;

an SRS associated with an SRS request indicated by the DCI monitored on the first CORESET is associated with the neighbor cell or the neighbor TRP;

a Channel State Information (CSI) configuration associated with a CSI request indicated by the DCI monitored on the first CORESET is associated with the neighbor cell or the neighbor TRP;

a BandWidth Part (BWP) associated with a BWP indicator indicated by the DCI monitored on the first CORESET is associated with the neighbor cell or the neighbor TRP; or an SRS power control command indicated by the DCI monitored on the first CORESET is associated with the neighbor cell or the neighbor TRP.

16. The terminal according to claim 15, wherein that the TCI is associated with the neighbor cell or the neighbor TRP comprises:
an RS indicated by the TCI is associated with the neighbor cell or the neighbor TRP; or
the TCI carries the identifier information of the neighbor cell or the neighbor TRP.

17. A non-transitory computer-readable medium, storing instructions that, when executed by a processor, cause the processor to perform operations comprising:
determining, according to a Downlink Control Information (DCI) indicator, whether a cell handover trigger condition is met; and
performing a cell handover when the cell handover trigger condition is met,
wherein that the cell handover trigger condition is met is determined according to at least one of the following:
a Transmission Configuration Indicator (TCI) indicated by DCI monitored on a first Control REsource SET (CORESET) is associated with a neighbor cell or neighbor Transmission and Reception Point (TRP);
the DCI monitored on the first CORESET carries identifier information of the neighbor cell or the neighbor TRP;
a Sounding Reference Signal (SRS) associated with an SRS resource indicator indicated by the DCI monitored on the first CORESET is associated with the neighbor cell or the neighbor TRP;
a Reference Signal (RS) in spatial correlation information of a Physical Uplink Control CHannel (PUCCH) resource indicated by the DCI monitored on the first CORESET is associated with the neighbor cell or the neighbor TRP;
a Physical Uplink Shared CHannel (PUSCH) power control command indicated by the DCI monitored on the first CORESET is associated with the neighbor cell or the neighbor TRP;
a PUCCH power control command indicated by the DCI monitored on the first CORESET is associated with the neighbor cell or the neighbor TRP;
an SRS associated with an SRS request indicated by the DCI monitored on the first CORESET is associated with the neighbor cell or the neighbor TRP;
a Channel State Information (CSD) configuration associated with a CSI request indicated by the DCI monitored on the first CORESET is associated with the neighbor cell or the neighbor TRP;
a BandWidth Part (BWP) associated with a BWP indicator indicated by the DCI monitored on the first CORESET is associated with the neighbor cell or the neighbor TRP; or
an SRS power control command indicated by the DCI monitored on the first CORESET is associated with the neighbor cell or the neighbor TRP.

18. The terminal according to claim 15, wherein before the determining, by a terminal according to a DCI indicator, whether a cell handover trigger condition is met, the operations further comprise: receiving first configuration information, wherein the first configuration information is used for configuring at least one of the following:
an RS indicated by the TCI;
the SRS associated with the SRS resource indicator;
the spatial correlation information of the PUCCH resource;
the PUSCH power control command;
the PUCCH power control command;
the SRS associated with the SRS request;
the CSI configuration associated with the CSI request;
the BWP associated with the BWP indicator; or
the SRS power control command.

19. The non-transitory computer-readable medium according to claim 17, wherein that the TCI is associated with the neighbor cell or the neighbor TRP comprises:
an RS indicated by the TCI is associated with the neighbor cell or the neighbor TRP; or
the TCI carries the identifier information of the neighbor cell or the neighbor TRP.

20. The non-transitory computer-readable medium according to claim 17, wherein before the determining, by a terminal according to a DCI indicator, whether a cell handover trigger condition is met, the operations further comprise: receiving first configuration information, wherein the first configuration information is used for configuring at least one of the following:
an RS indicated by the TCI;
the SRS associated with the SRS resource indicator;
the spatial correlation information of the PUCCH resource;
the PUSCH power control command;
the PUCCH power control command;
the SRS associated with the SRS request;
the CSI configuration associated with the CSI request;
the BWP associated with the BWP indicator; or
the SRS power control command.

\* \* \* \* \*